United States Patent Office 2,754,299
Patented July 10, 1956

2,754,299
HETEROCYCLIC CHALCONE COMPOUNDS

Daniel H. Deutsch and Eugene N. Garcia, Los Angeles, Calif., assignors to Lasdon Foundation, Inc., Yonkers, N. Y., a corporation of Delaware No Drawing. Application July 2, 1954,
Serial No. 441,175

3 Claims. (Cl. 260—240)

This invention relates to certain novel chemical compounds and relates more particularly to the novel substituted chalcones of the following formula

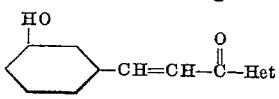

wherein Het represents a heterocyclic radical which may be a sulfur-containing hetero radical such as a thienyl group or an oxygen-containing hetero radical such as a furyl group.

An object of this invention is the provision of certain novel organic compounds which are useful as enzyme inhibitors in certain enzyme systems.

Another object of this invention is the preparation of chalcone compounds containing a heterocyclic substituent and which are adapted to inhibit the in vivo enzymatic activity of dihydroxyphenylalanine decarboxylase.

Other objects of this invention will appear from the following detailed description.

Compounds having the ability to inhibit the activity of enzymes are finding increased application. We have now found that the compounds of the above heterocyclic-substituted chalcone structure have a marked ability to inhibit the activity of the enzyme dihydroxypheylalanine decarboxylase.

The novel compounds of our invention may be obtained by condensing meta-hydroxybenzaldehyde with 2-acetylfuran or with 2-acetylthiophene in a suitable reaction medium comprising a solvent such as methanol, for example, with the aid of sodium methoxide, which acts as a condensing agent.

In order further to illustrate our invention but without being limited thereto, the following examples are given:

Example I

To a solution of 21.8 parts by weight of meta-hydroxybenzaldehyde and 13.6 parts by weight of 2-acetylfuran in 100 parts by weight of methanol is added a solution of 5.5 parts by weight of sodium in 60 parts by weight of methanol. The mixture is held at about 20° C. for six hours and the dark brown reaction mixture then poured on to about 50 parts by weight of ice. The aqueous mixture is then acidified with concentrated hydrochloric acid to a pH of 3 and the yellow precipitate which forms is filtered off and washed with water. The yellow crystals of 2-(3-hydroxy cinnamoyl) furan are air-dried and recrystallized twice from hot benzene. This compound melts at 144.5–146° C. Analysis for carbon and hydrogen is:

|  | Percent C | Percent H |
| --- | --- | --- |
| Calculated | 72.88 | 4.70 |
| Found | 72.89 | 4.69 |

Example II

To a solution of 24.4 parts by weight of meta-hydroxybenzaldehyde and 16.8 parts by weight of 2-acetylthiophene in 100 parts by weight of methanol are added a solution of sodium methoxide prepared from 5.5 parts by weight of sodium in 60 parts by weight of methanol. The solution is held at room temperature for 6 hours and the dark red solution then poured on to 50 parts by weight of ice. The aqueous mixture is acidified to a pH of 3 with concentrated hydrochloric acid and the yellow precipitate which forms is filtered off, washed with water and recrystallized twice from hot benzene. The 2-(3-hydroxycinnamoyl) thiophene obtained melts at 141.5–143° C. Analysis for carbon and hydrogen is:

|  | Percent C | Percent H |
| --- | --- | --- |
| Calculated | 67.79 | 4.37 |
| Found | 67.72 | 4.29 |

While the novel compounds more specifically disclosed above are substituted in the 2-position of the furyl and thienyl radicals, the corresponding 3-isomers are obtained by utilizing 3-acetylfuran or 3-acetylthiophene as intermediates in the condensation reaction described.

It is understood that the foregoing detailed description is given merely by way of illustration and that many variations may be made therein without departing from the spirit of our invention.

Having described our invention, what we desire to secure by Letters Patent is:

1. Compounds of the formula

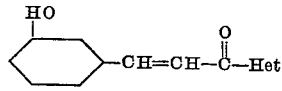

wherein Het is a heterocyclic radical of the group consisting of thienyl and furyl radicals.
2. 2-(3-hydroxycinnamoyl) furan.
3. 2-(3-hydroxycinnamoyl) thiophene.

References Cited in the file of this patent
UNITED STATES PATENTS

| 2,028,141 | Ackerman | Jan. 21, 1936 |
| 2,356,823 | Cole | Aug. 29, 1944 |
| 2,622,980 | Copeland | Dec. 23, 1952 |

OTHER REFERENCES
Weygand: Berichte, vol. 68 (1935), pp. 1839–47.